United States Patent [19]

De Nora et al.

[11] 4,235,695

[45] Nov. 25, 1980

[54] NOVEL ELECTRODES AND THEIR USE

[75] Inventors: Vittorio De Nora, Nassau, The Bahamas; Antonio Nidola; Placido M. Spaziante, both of Lugano, Switzerland

[73] Assignee: Diamond Shamrock Technologies S.A., Geneva, Switzerland

[21] Appl. No.: 858,968

[22] Filed: Dec. 9, 1977

[51] Int. Cl.³ .................... C25B 11/10; C25B 11/06; C25B 1/34

[52] U.S. Cl. ................ 204/268; 204/290 R; 204/290 F; 204/294; 204/98

[58] Field of Search ............... 204/268, 290 F, 290 R, 204/294; 423/447.1, 447.2; 264/29.1, 29.2

[56] References Cited

U.S. PATENT DOCUMENTS

| | | | |
|---|---|---|---|
| 3,329,594 | 7/1967 | Anthony et al. | 204/95 |
| 3,427,234 | 2/1969 | Guthke et al. | 204/73 A |
| 3,446,607 | 5/1969 | Volk et al. | 204/290 R X |
| 3,451,914 | 6/1969 | Colman | 204/268 |
| 3,632,498 | 1/1972 | Beer | 204/290 F |
| 3,660,255 | 5/1972 | Fox et al. | 204/59 F |
| 3,711,385 | 1/1973 | Beer | 204/59 R |
| 3,824,175 | 7/1974 | Schultz et al. | 204/290 F |
| 3,927,186 | 12/1975 | Vinton et al. | 423/447.1 |
| 3,932,244 | 1/1976 | Mikkelsen | 204/294 X |
| 4,022,875 | 5/1977 | Vinton et al. | 423/445 |
| 4,046,664 | 9/1977 | Fleet et al. | 204/280 |

FOREIGN PATENT DOCUMENTS

| | | | |
|---|---|---|---|
| 1467226 | 1/1969 | Fed. Rep. of Germany | 204/290 F |
| 186981 | 11/1966 | U.S.S.R. | 204/268 |

OTHER PUBLICATIONS

Fleet, Nature, vol. 263, pp. 122, 123, Sep. 9, 1976.

*Primary Examiner*—F. Edmundson
*Attorney, Agent, or Firm*—Hammond & Littell, Weissenberger and Muserlian

[57] ABSTRACT

Novel dimensionally stable, porous electrodes made of vitreous or glassy carbon forming a porous body optionally provided on at least a portion of its outer surface with a coating containing an electrocatalytic agent and to electrochemical cells containing the said electrodes and to a method of electrolysis, preferably wherein a halogen is evolved at the anode.

15 Claims, No Drawings

NOVEL ELECTRODES AND THEIR USE

STATE OF THE ART

Graphite has been used for many years as an electrode for various electrolytic processes such as the production of halogen from brines. While graphite is generally preferred to other forms of carbon because it shows good electrical conductivity and good electrocatalytic activity, it suffers from various defects, especially when used as an anode. Graphite is in fact rapidly consumed under operation due to oxidation to CO and/or $CO_2$ and it wears away through spalling and blistering requiring periodic adjustment of the position of the electrodes and frequent replacement of the electrodes. These defects are caused or at least enhanced by the fact that graphite shows evolution potentials for halogen and oxygen very close together and, in fact, oxygen is discharged concurrently with the halogen causing oxidation of the graphite. Moreover, anions adsorbed on the surface of the electrode tend to form interlamellar compounds with graphite, giving rise to blistering and spalling of the surface.

Porous carbon systems prepared in various ways have been suggested as a substitute for graphite, especially as reinforcing materials for composites, as packing material and as heating or heat resistant materials. The known systems are usually prepared by impregnating polyurethane resin strands with volatile and/or decomposible compounds at the curing temperature which is $\leq 500°$ C. or by impregnating porous graphite with volatile ammonium salts, such as $(NH_4)_2SO_4$, $NH_4Cl$ etc. or with compounds capable of decomposing to give gaseous products such as $N_2H_4$, $NH_4OH$, $NH_2OH+CH_3COOH$, $N_2H_4+CH_2(COOH)_2$, at the curing temperature of $\leq 500°$ C. The resulting product also suffers from very, very low mechanical strength and a porous structure with many cracks. When these materials are used as electrochemical electrodes, particularly as anodes, they fail in very short times due to the rapid oxidation of carbon and to spalling and disintegration of the material.

OBJECTS OF THE INVENTION

It is an object of the invention to provide novel dimensionally stable, porous electrodes made of vitreous carbon which offer a great resistance to oxidation and a much improved mechanical stability.

It is a further object to provide porous vitreous carbon electrodes provided over at least a portion of their surface with a coating containing an electrocatalytic agent.

It is another object of the invention to provide novel electrolysis cell containing porous vitreous carbon electrodes.

It is an additional object of the invention to provide a novel method of electrolysis for the preparation of a chemical product using as the anode a dimensionally stable, porous electrode made of vitreous carbon.

These and other objects and advantages of the invention will become obvious from the following detailed description.

THE INVENTION

The novel dimensionally stable, porous electrodes of the invention are vitreous or glassy carbon strands or reticulated structures, which are crack free and are thermally stable up to 2500° C. in vacuum or an inert or a reducing atmosphere, preferably forming a rigid reticulated porous body. The degree of porosity and of permeability of the reticulated body may vary within ample limits and depends on the density per unit volume and size of the glassy carbon strands, but normally the porosity will vary between 30 and 80% and the size of the glassy carbon strands will be between 0.005 cm and 0.2 cm.

The electrodes, when polarized as anodes for the electrolysis of alkali metal halide solutions, show a reasonably low halogen discharge overpotential e.g. for chlorine and bromine and a high overpotential for oxygen discharge. The difference in potential between the halogen and oxygen evolution potentials appears to effectively inhibit oxidation of the carbon structure to CO and $CO_2$ and besides avoiding a rapid consumption of the electrodes, this also improves the faraday efficiency of the electrolysis process by reducing the loss of energy by the undersired formation of oxygen.

Unexpectedly it has been found that electrodes made of glassy or vitreous carbon, which is generally characterized as disordered carbon whose crystal structures are distinctive in this respect as is well defined in the literature, show outstanding characteristics such as a good electrical conductivity comparable with that of graphite, good electrocatalytic activity, especially with respect to halogen evolution, and a high oxygen overpotential. Moreover, it has also been found that electrodes made of glassy or vitreous carbon show a far better mechanical stability than traditional graphite and carbon electrodes, especially under anodic polarization. This may be explained by the fact that the glassy carbon electrodes of the invention present a very smooth, glassy and crack-free surface and that the disordered carbon crystal structure is far less amenable to give rise to high co-ordination number compounds with the anionic species adsorbed on the electrodes surface.

In a preferred modification of the invention, the glassy carbon porous structure may be provided over at least a portion of its surface exposed to the contact with the electrolyte with a coating containing an electrocatalyst for the desired electrolytic reaction. The preferred electrocatalysts are the platinum group metals or oxides thereof alone or in admixture with other metals and/or oxides such as described in U.S. Pat. Nos. 3,711,385 and 3,632,498.

Vitreous or glassy carbon materials are known and may be prepared by various methods but one of the preferred methods is that described in U.S. Pat. No. 3,927,186 since it is one of the most rapid. The process of the patent results in a carbon structure produced from flexible polyurethane resin strands which retains the geometry or shape of the uncarbonized starting polyurethane resin strands.

The vitreous carbon materials are prepared by infusing polyurethane resin strands with a curable furan resin or resin precursor which causes the polyurethane strands to swell during infusion to form a gel-like alloy structure with the polyurethane as the solid phase, removal of excess furan resin from the surface of the strands which is essential to prevent cracking of the strands during carbonization, polymerizing the furan resin or precursor, preferably with a catalyst, to form a polymerized, thermoset and hardened structure wherein the infusing, removing and polymerizing of the resin produces a resulting weight up to about 6 times the weight of the polyurethane alone and then rapidly heating the said structure in a non-oxidizing atmosphere to a temperature of at least 1000° C. to form the crack-free, porous vitreous carbon structure. The carbonization is usually achieved in less than 3 hours at a rate of temperature change of the structure which causes cracks in pretreated strands with non-infused thermoset furan resin coated on the surface thereof.

Polyester and polyether polyurethane cellular materials, (e.g. the so called "one-shot" polyether polyurethanes) can be used as precursors for the reticulate polyurethane strand structures which can be used as the precursors for the carbon structure. The production of flexible polyurethane materials, particularly cellular materials of various types is well understood in the polymer art and is described for example in "German Plastics and Practice" published by DeBell and Richardson, 1946, Chapter 21, "Plastic Foams," pages 462–465; "Papers Presented at the Atlantic City Meeting: Syntheseis of Isocyanate Polymers" published by the American Chemical Society Division of Paints, Plastics and Printing Ink Chemistry, September 1956; and in the patent literature and more recent publications.

Solid elastomeric polyurethanes suitable as precursors for the filamentary carbon structures can be made into filamentary form by a variety of methods such as extruding, spinning or casting and their preparation is described in Polyurethanes Chemistry Technology, Part II by Saunders and Frisch, Interscience Publishers, 1964, starting on page 694.

The furan resins useful for the method of producing the carbon structures are provided in situ in liquid monomeric, prepolymer or prethermoset form in the flexible polyurethane resin strand. The polyrethane resin strands swell in contact with the liquid resin or resin precursors of furan resins to form a gel-like structure. After removal of unabsorbed liquids, they can then be polymerized or cured to a solid within the polyurethane structure. The furan resin precursors which are preferred are furfuryl alcohol alone or liquid relatively low molecular weight furfuryl alcohol polymers (prepolymers) alone or mixed with furfuryl alcohol. The prepolymers can be used along or in admixture with other compatible solvents or resins. The liquid furan resin precursors are catalyzed by mineral or organic acids to form thermosetting resins. Partial polymerization can be used to vary the viscosity of the liquid resin before infusion. Furan resin systems are described generally in Polymers and Resins, Brage Golding, pages 366 to 373 (D. Van Nostrand Company, Inc. 1959).

Various shapes of carbon structures of strands can be produced by the method such as single strands; woven meshes of strands; reticulated structures; non-woven nets or mats of fibers or strands; crimped strands and the like. The flexible polyurethane strands used as starting materials can be single or multiple layered, and crimped or non-crimped. Diameters in the range of 0.005 cm to 0.1 cm are suitable.

The polyurethane foams which are used as a precursor to the starting materials must be reticulated to form the starting material, that is the membranes dividing contiguous cells produced as a result of foaming must be removed. Foam structures are reticulated by mechanical means, including air or water blasts; chemical means, particularly hydrolysis of the polyurethane resin, or preferably by thermal means as shown in U.S. Pat. No. 3,175,025 by the combustion of gas mixtures inside the foam to destroy the membranes leaving the filamentary strand structure, thus altering the geometry from a foam to a reticulated structure.

The reticulated polyurethane structures provide a workable geometry of thin cross-section strands for easy removal of liquid furan resin or resin precursor from the strand surfaces prior to curing and can be rapidly heated to produce thermosetting of the furan resin or resin precursor and subsequent carbonization. The open structure of reticular polyurethane also permits ready infusion of the strands by the liquid furan resin or resin precursor. Foam structures as such are not suitable because the windows or membranes retain substantial quantities of the furan resin or resin precursor.

The arrangement of carbon atoms in the products produced by the method varies depending upon the temperature, duration and/or conditions of carbonization. The preferred form is termed "glassy" or "vitreous" carbon, which is generally characterized as disordered carbon whose crystal structures are distinctive in this respect, as is well defined in the literature. This can be obtained by firing at about 1000° C. or higher. Firing can go to about 2500° C. or even higher, but it is unnecessary for many applications.

The carbonized products produced, regardless of the extent of carbonization, are crack-free present a glassy surface and remain resistant to cracking due to temperature changes under non-oxidizing conditions. Conditions of carbonization to produce vitreous carbon are well known in the art and the method uses the same ultimate temperatures of carbonization as prior art methods, but differs in that the time required to reach these carbonization temperatures is very greatly reduced by the present method. The reticulated carbon structures produced have a density of between 0.03 and 0.08 gm/cc.

Other methods which are well known in the literature may be used to produce similarly suitable glassy carbon strands or reticulated structures from starting materials such as polyacrylonitrile resin, cellulose, pitch, vinyl alcohol, thermosetting resins etc.

In a variation of the electrodes of the invention, the porous glassy carbon electrode body is provided over at least a portion of its outer surface with a coating containing an electrocatalyst for the desired electrolysis reaction. The preferred electrocatalyts are platinum group metals or oxides thereof alone or in admixture with other metals and/or oxides.

In addition to their chemical resistivity, the oxides and mixtures and mixed crystals of the oxides of the platinum metals with each other and with oxides of certain other metals such as valve metals generally have the particular advantage that the threshold value at which they are capable of dissociating an electrolyte is lower than that of the pure platinum metal or an alloy of the pure platinum metals, so that the overall electrical energy to be supplied for the electrolytic process is considerably less, which in turn often also avoids undesirable side reactions. This also makes it possible to carry out catalytic reactions at such an electrode.

However, the threshold value can be changed as desired by the addition of other oxides of non-film forming metals such as of manganese, lead, chromium, cobalt, and iron. Additions of oxides of film-forming metals such as titanium, tantalum, zirconium, niobium and tungsten can act to raise or lower the threshold value depending on the amount added. Furthermore, the platinum group metal oxides, with or without the addition of such other oxides, are considerably more active catalytically than the corresponding platinum metals, thereby providing substantial technical advantages in catalytic and/or electrochemical reactions of organic compounds or in electrolytic processes in an organic medium.

According to a preferred method for coating the vitreous carbon electrodes of the invention, the porous vitreous carbon body is immersed in a liquid solution of thermally reducible metal salts in an organic or inorganic solvent medium and the impregnated body is then dried and fired in an oven at temperatures of 300° to 500° C. under controlled atmospheric conditions, preferably in the presence of oxygen, to convert the metal salts to either the metal itself or to the metal oxides. Metal coatings may also be provided over at least a portion of the electrode surface by electrolyte deposition, by vacuum sputtering and other known techniques.

Besides applying the electrocatalysts as a coating of the vitreous carbon, the electrocatalyts can be incorporated into the starting material strands before they are carbonized.

The electrolysis process of the invention may be used effectively for the electrolysis of many electrolytes. The electrodes may be used as anodes and/or cathodes in electrochemical process such as the electrolysis of aqueous chloride solutions for production of chlorine, caustic, hydrogen, hypochlorite, chlorate and perchlorate; the electrowinning of metals from aqueous chloride solutions for production of copper, zinc, nickel, cobalt and other metals; and for the electrolysis of bromides, sulfides, hydrochloric acid and hydrofluoric acid.

Generally, the process of the invention is useful where an electric current is passed through an electrolyte to decompose the electrolyte, for effecting oxidation and reduction of organic and inorganic compounds or to impress a cathodic potential on a metallic structure to protect it from corrosion as well as in primary and secondary batteries.

The electrodes of the invention may also be used as bipolar electrodes. Various bipolar arrangements may be resorted to depending on the particular electrolytic process. For example, a mat of vitreous carbon strands in the form of a rigid reticulated porous body may be bonded in electrical conducting relationship to a sheet of a suitable cathodic material, such as a sheet of titanium, iron, copper, nickel or alloys thereof by means of a conductive adhesive that is chemically resistant to the electrolyte. In the impervious bipolar electrode thus obtained, the vitreous carbon mat operates as the anode while the metal sheet will operate as the cathode in the bipolar succession. The vitreous carbon mat may be provided with a coating of suitable anodically-resistant electrocatalytic material.

Another bipolar electrode especially useful in electrolytic processes for the oxidation and reduction of organic compounds may be realized with a single porous mat of vitreous carbon having a thickness sufficient to minimize current by-pass through the electrolyte, inserted between a terminal anode and a terminal cathode respectively connected to the power supply. For the well-known effect which is utilized in packed electrochemical reactors, that is, provided that the electronic current path through the porous bipolar electrode has a conductivity substantially greater than the ionic conductivity through the electrolyte flooding the porous electrode itself, the porous vitreous carbon electrode will operate as an anode over the surface opposite to the operatively facing cathode and as a cathode over the surface opposite to the operatively facing anode.

The electrolysis cells of the invention comprises a cell provided with at least one set of a spaced anode and cathode and a means for impressing an electrolysis current on the said cell, the said anode being a dimensionally stable, porous electrode as discussed above.

The following examples described several preferred embodiments to illustrate the invention. However, it should be understood that the invention is not intended to be limited to the specific embodiments.

EXAMPLE 1

A mat of interconnected strands of glassy carbon, as produced by Chemotronic Inc., Mich., and having an apparent porosity of about 70% and an average strand diameter of 0.03 cm and a thickness of ½ inch, was cut into samples of 10×5 cm and each sample was provided with a titanium current lead bonded to the porous body with a conductive adhesive. One set of samples was immersed in a galvanic bath and cathodically polarized to deposit a flash coating of platinum metal amounting to 5 gms per square meter of projected surface.

The two sets of electrodes were used in a test cell as anodes for the electrolysis of: (a) an aqueous solution of 10% sulfuric acid, (b) an aqueous sodium chloride solution of 300 g/l of sodium chloride and (c) an aqueous sodium bromide solution of 200 g/l of sodium bromide. The current density was increased and the anode potential in V(NHE) was recorded. The results are reported in Table I.

TABLE I

| Test Samples | Type of electrolyte | Temp. 0° C. | Anode potential in V(NHE) at the indicated current density (apparent) A/m$^2$ | | | | | Weight loss after 100 hrs. at 500 A/cm$^2$ |
|---|---|---|---|---|---|---|---|---|
| | | | 50 | 100 | 200 | 500 | 1000 | |
| Uncoated vitreous carbon strands | a | 60 | 1.52 | 1.57 | 1.85 | 2.30 | 2.75 | 10 mg/cm$^2$ |
| | b | 60 | 1.42 | 1.43 | 1.46 | 1.70 | 2.25 | 0.1 mg/cm$^2$ |
| | c | 60 | 1.30 | 1.32 | 1.35 | 1.51 | 1.92 | 0.1 mg/cm$^2$ |
| Pt coated vitreous carbon strands | a | 60 | 1.45 | 1.48 | 1.65 | 1.98 | 2.30 | 8 mg/cm$^2$ |
| | b | 60 | 1.32 | 1.32 | 1.40 | 1.60 | 2.05 | none |
| | c | 60 | 1.30 | 1.30 | 1.32 | 1.39 | 1.65 | none |

The results show that a considerable potential gap exists between the evolution potential for the halogens [electrolytes b) and c)] and the evolution potential for oxygen (electrolyte a). This gap is of the order of 100 to 500 mV or more. Moreover, the catalytic activity of the vitreous carbon electrodes can distinctly be improved by at least partially coating its surface exposed to the electrolyte with a catalytic material such as platinum as evidenced by the lower potentials for chlorine evolution.

EXAMPLE 2

A mat of interconnected strands of glassy carbon as produced by Chemotronics Inc., Mich. and having an apparent porosity of about 45% and an average strand diameter of 0.01 cm. and a thickness of ½ inch was cut into samples of 10×5 cm. One set of samples was coated with a mixed crystal material consisting of iridium, ruthenium and titanium metal oxides by immersing the samples in a coating solution having the following composition:

| | |
|---|---|
| Ruthenium as $RuCl_3H_3O$ | 10 mg (metal) |
| Iridium as $(NH_4)_2IrCl_6$ | 10 mg (metal) |
| Titanium as $TiCl_3$ | 56 mg (metal) |
| Formamide ($HCONH_2$) | 10 to 12 (drops) |
| Hydrogen peroxide ($H_2O_2$ 30%) | 3 to 4 (drops) |

The coating solution was prepared by first blending or mixing the ruthenium and iridium salts containing the required amounts of Ru and Ir in 5 ml of a 2 molar solution of hydrochloric acid and allowing the mixture to dry until a dry precipitate is formed. Formamide is then added at about 40° C. to dissolve the mixture. The titanium chloride dissolved in hydrochloric acid (15% strength commercial solution) is added to the dissolved Ir-Ru salt mixture and a few drops of 30% hydrogen peroxide are added which is sufficient to make the solution turn from the blue color of the commercial solution of $TiCl_3$ to an orange color.

After immersion, the samples were heated in an oven under forced air circulation to 300°–350° C. for 10 to 15 minutes, followed by natural cooling in air, and the procedure was repeated a number of times to obtain a coating amounting to 10 grams per square meter of projected surface.

Each sample of the two sets was provided with a titanium current lead as described in Example 1, and the samples were used as anodes for the electrolysis of an aqueous sodium chloride solution (300 g/l of NaCl) at 60° C. at 500 A/m² of projected surface. After 300 hours of operation, the uncoated samples showed an average anode potential of 1.75 V (NHE) and an average weight loss of 0.2 mg/cm² of projected surface. Under the same conditions, the coated samples showed an average anode potential of 1.50 V (NHE), and an average weight loss of 0.1 mg/cm² of projected surface.

Various modifications of the electrodes and cells and processes of the invention may be made without departing from the spirit or scope thereof and it is to be understood that the invention is intended to be limited only as defined in the appended claims.

We claim:

1. In an electrolysis cell comprising a cell provided with at least one set of an anode and a cathode and means for impressing an electrolysis current on the cell, the improvement comprising as the anode a dimensionally stable, rigid, reticulated, porous electrode made of an vitreous or glassy carbon strands, or reticulated structures which are crack-free and thermally stable up to 2500° C.

2. The cell of claim 1 wherein the porous electrode has a porosity of 30 to 80% and the glassy strands have a cross-section of 0.005 to 0.2 cm.

3. The cell of claim 1 wherein at least a portion of the surface of the porous body is provided with a coating of an electrocatalytic agent.

4. The cell of claim 3 wherein the electrocatalytic agent contains at least one member selected from the group consisting of a platinum group metal and a platinum group metal oxide.

5. The cell of claim 1 wherein the porous body is prepared by carbonization of polyurethane resin strands infused with a curable furan resin.

6. A dimensionally stable bipolar electrode comprising a rigid, reticulated porous body made of a vitreous or glassy carbon strands or reticulated structure which are crack-free and thermally stable up to 2500° C. bonded in an electrically conductive relationship to a sheet of cathodic material.

7. The electrode of claim 6 wherein the cathodic material is a sheet of a valve metal, iron, copper, nickel or alloys thereof.

8. The electrode of claim 6 wherein the porous electrode has a porosity of 30 to 80% and the glassy strands have a cross-section of 0.005 to 0.2 cm.

9. The electrode of claim 6 wherein at least a portion of the surface of the porous body is provided with a coating of an electrocatalytic agent.

10. The electrode of claim 6 wherein the electrocatalytic agent contains at least one member selected from the group consisting of a platinum group metal and a platinum group metal oxide.

11. The electrode of claim 6 wherein the porous body is prepared by carbonization of polyurethane resin strands infused with a curable furan resin.

12. An electrode comprising a rigid, reticulated porous body made of a vitreous or glassy carbon strands or reticulated structure which are crack-free and thermally stable up to 2500° C. provided over at least a portion of the surface of the porous body with a coating of an electrocatalytic agent.

13. The electrode of claim 12 wherein the electrocatalytic agent contains at least one member selected from the group of platinum group metals and a platinum group metal oxide.

14. The electrode of claim 12 wherein the porous electrode has a porosity of 30 to 80% and the glassy strands have a cross-section of 0.005 to 0.2 cm.

15. The electrode of claim 12 wherein at least a portion of the surface of the porous body is provided with a coating of an electrocatalytic agent.

* * * * *

UNITED STATES PATENT AND TRADEMARK OFFICE
CERTIFICATE OF CORRECTION

PATENT NO. : 4,235,695
DATED : November 25, 1980
INVENTOR(S) : Vittorio De Nora et al It is certified that error appears in the above—identified patent and that said Letters Patent is hereby corrected as shown below:

Column 1, lines 31 and 36: "$\gtrapprox 500$" should read -- $\geq 500$ --.

Column 3, line 43: "along" should read -- alone --.

Signed and Sealed this

Twenty-eighth Day of April 1981

[SEAL]

Attest:

RENE D. TEGTMEYER

Attesting Officer     Acting Commissioner of Patents and Trademarks